US006657709B2

(12) United States Patent
Koh et al.

(10) Patent No.: US 6,657,709 B2
(45) Date of Patent: Dec. 2, 2003

(54) APPARATUS AND METHOD FOR MEASURING POLARIZATION-DEPENDENT LOSS USING REPEATED HIGH SPEED POLARIZATION SCRAMBLING

(75) Inventors: Yeon Wan Koh, Taejon (KR); Bong Wan Lee, Taejon (KR); Jung Won Kim, Taejon (KR)

(73) Assignee: Donam Systems Inc. (KR)

( * ) Notice: Subject to any disclaimer, the term of this patent is extended or adjusted under 35 U.S.C. 154(b) by 0 days.

(21) Appl. No.: 10/276,480

(22) PCT Filed: Feb. 7, 2002

(86) PCT No.: PCT/KR02/00195

§ 371 (c)(1), (2), (4) Date: Nov. 15, 2002

(87) PCT Pub. No.: WO02/077680

PCT Pub. Date: Oct. 3, 2002

(65) Prior Publication Data

US 2003/0111998 A1 Jun. 19, 2003

(30) Foreign Application Priority Data

Mar. 16, 2001 (KR) .................................... 2001/13540

(51) Int. Cl.[7] ............................................ G01N 21/00
(52) U.S. Cl. .................................................. 356/73.1
(58) Field of Search ......................... 356/73.1; 385/1–8, 385/11–14, 24–38, 123, 126, 137; 359/256, 494, 497, 900

(56) References Cited

U.S. PATENT DOCUMENTS 5,371,597 A 12/1994 Favin et al. ................ 356/367
6,480,637 B1 * 11/2002 Yao ............................ 385/11
6,493,474 B1 * 12/2002 Yao ............................ 385/11

FOREIGN PATENT DOCUMENTS

| | | |
|---|---|---|
| JP | 07-063669 | 3/1995 |
| JP | 2000-329649 | 11/2000 |
| WO | WO00/65324 | 11/2000 |

* cited by examiner

*Primary Examiner*—Tu T. Nguyen
(74) *Attorney, Agent, or Firm*—Marger Johnson & McCollom, P.C.

(57) ABSTRACT

Disclosed is an apparatus and method for measuring a changing amount of insertion loss of an optical device depending on a polarization state of an incident light, i.e., a polarization-dependent loss. An incident light that is periodically subject to all polarization states passes through a testing optical device by a polarization scrambler including a piezoelectric element type optical fiber birefringence modulator, and an optical detector measures intensity of the passing light, in which the measured intensity values are averaged for birefringence modulation having a constant period, and then the polarization-dependent loss is computed from a ratio of maximum power to minimum power for the period. Use of the birefringence modulator shortens measuring time, and decreases an affect of external disturbance to the incident light that is incident into the testing optical component or occurrence probability of the external disturbance, so that the polarization-dependent loss can be precisely measured.

6 Claims, 3 Drawing Sheets

APPARATUS AND METHOD FOR MEASURING POLARIZATION-DEPENDENT LOSS USING REPEATED HIGH SPEED POLARIZATION SCRAMBLING

TECHNICAL FIELD

The present invention relates to an apparatus and method for measuring a changing amount of insertion loss of an optical device depending on a polarization state of an incident light, i.e., a polarization-dependent loss.

BACKGROUND ART

Due to development of very high-speed optical communication technology, various optical elements are being developed. In order to effectively manage qualities of the optical elements, the optical communication industry requires optical measuring instruments having high reliability and high measuring speed. In particular, as introduction of Wavelength Division Multiplexing (WDM) transmission method promotes the necessity of measuring the features of the optical devices with respect to various wavelengths across wide wavelength ranges, the requirement is also increasing for optical measuring instruments having high measuring speed.

Among various specifications of the optical elements, Polarization-Dependent Loss (PDL), in particular, is characterized in that measurement thereof is difficult and the measuring time is long. Moreover, PDL is one of major features of the optical devices which require strict quality control since it can cause degradation of signal as optical communication increases in speed.

Insertion loss or PDL of optical device is defined from the ratio of the intensity of an input optical signal to the intensity of an output optical signal, and depends on polarization of an incident light. PDL representing such features is generally measured as follows: First, an incident light is introduced into a Device Under Test (DUT) subject to PDL measurement while the polarization of the incident light is varied and the intensity thereof is maintained constant. Then, the intensity of an output light is measured. PDL is obtained from the ratio of the maximum output $P_{max}$ to the minimum output $P_{min}$ as defined in Equation 1:

$$PDL = 10 \cdot \log\left(\frac{P_{\max}}{P_{\min}}\right). \qquad \text{Equation 1}$$

Conventional methods for measuring PDL defined as above include all state scanning method and Mueller matrix method. The all state scanning method forms polarization states of an incident light as various as possible and measures the intensity of an output light so as to obtain the maximum output value and the minimum output value, and description thereof is as follows.

FIG. 1 shows the structure of an apparatus for measuring PDL according to the all state scanning method. Referring to FIG. 1, a laser diode 100 has an output signal with a predetermined polarization state and intensity. The output signal from the laser diode 100 primarily propagates along a polarization adjuster 110, in which the polarization adjuster 110 is comprised of a few waveplates made of optical fiber. Changing the angles of the waveplates allows adjustment of the polarization state of an incident light entering a DUT 130 via an optical fiber 120. An optical power meter measures the intensity of the output optical signal from the DUT 130. In other words, the waveplates of the polarization adjuster 110 are scanned in the angles so that the input optical signal has all polarization states after propagating along the DUT 130, and then the maximum and minimum values of the polarized output optical signal are extracted for a predetermined time period so as to calculate PDL values. However, this apparatus has the worst disadvantage that mechanical polarization adjusters are generally used so that a measuring time is prolonged too long up to about 5 to 10 seconds thereby causing the apparatus rarely available at manufacturing sites.

In the meantime, the Mueller matrix method obtains the maximum output value and the minimum output value through mathematical calculation using output values about four correctly known input polarization states, in which a detailed measuring method thereof is disclosed in U.S. Pat. No. 5,371,597 granted to Favin et al. According to U.S. Pat. No. 5,371,597, polarization adjusters including manual and automatic polarization adjusters are used in order to obtain the known four polarization states of an incident optical signal at the leading end of a DUT. Available examples of the automatic polarization adjusters include ½ and ¼ waveplates, which are rotated to adjust polarization. In performing this method, however, there are restrictions that a calibration process is inevitable for determining the ratio between the intensity of the incident optical signal and the intensity of an output optical signal of the DUT with respect to each of the four polarization states and the measuring process requires correctly obtaining resultant values of the four polarization states after inputting the same. For the purpose of this, it is essential that the input polarization states have no disturbance, however, there is a problem that the disturbance inevitably takes place in the input polarization states if the measuring process is carried out for a long time period.

DETAILED DESCRIPTION OF THE INVENTION

It is a technical object of the present invention to provide an apparatus and method for measuring PDL capable of reducing the probability of disturbance occurrence from polarization of an incident light by completing the measurement of a polarization-dependent loss within a relatively short time.

It is another object of the present invention to provide an apparatus and method which can rapidly measure PDL according to an all states scanning method by using polarization modulators having a modulation speed of several hundreds kHz or more.

To accomplish the above objects, there is provided an apparatus for measuring a polarization-dependent loss. The apparatus comprises:

(a) a light source;

(b) a polarizer for converting a light irradiated from the light source into a polarized light;

(c) a polarization scrambler for modulating polarization state of the polarized light with a frequency F, the polarization scrambler including:

(c-1) optical fiber birefringence modulators including at least three cylindrical piezoelectric elements and optical fibers respectively wound around the outer walls of the piezoelectric elements without intermission, and (c-2) AC voltage sources synchronized to a common clock with respect to each of the optical fiber birefringence modulators for applying an AC voltage having a frequency corresponding to the multiple of an integer relatively prime with respect to a predetermined frequency F to the each optical fiber birefringence modulator;

(d) a photodetector for, when the output light of the polarization scrambler passes through an object under test, detecting the optical power of the output light undergoes the object;

(f) an ADC synchronized to the common clock, for providing an intensity profile of the output light with the period of 1/F; and (g) a digital signal processing unit for averaging the periodic intensity profile of the output light from the ADC to restrain a noise accompanying to each measurement.

According to another aspect of the invention, there is provided a method for measuring a polarization-dependent loss. The method comprises the steps of:

preparing a polarized incident light;

inputting the incident light into a polarization scrambler and outputting a polarization-scrambled output light with a predetermined frequency F, wherein the polarization scrambler comprises: optical fiber birefringence modulators including at least three cylindrical piezoelectric elements and optical fibers respectively wound around the outer walls of the piezoelectric elements without intermission, and AC voltage sources synchronized to a common clock with respect to each of the optical fiber birefringence modulators for applying an AC voltage having a frequency corresponding to the multiple of an integer relatively prime with respect to the predetermined frequency F to the each optical fiber birefringence modulator;

passing the light outputted from the polarization scrambler through an optical device under test;

detecting an output of the light that has passed through the optical device using a photodetector; and averaging detected values of the photodetector with respect to birefringence modulation having a constant period to calculate the polarization-dependent loss from a ratio of the maximum output and the minimum output with respect to the period.

BEST MODE FOR CARRYING OUT THE INVENTION

Hereinafter a preferred embodiment of the invention will be described in reference to the accompanying drawings.

Figure 2:
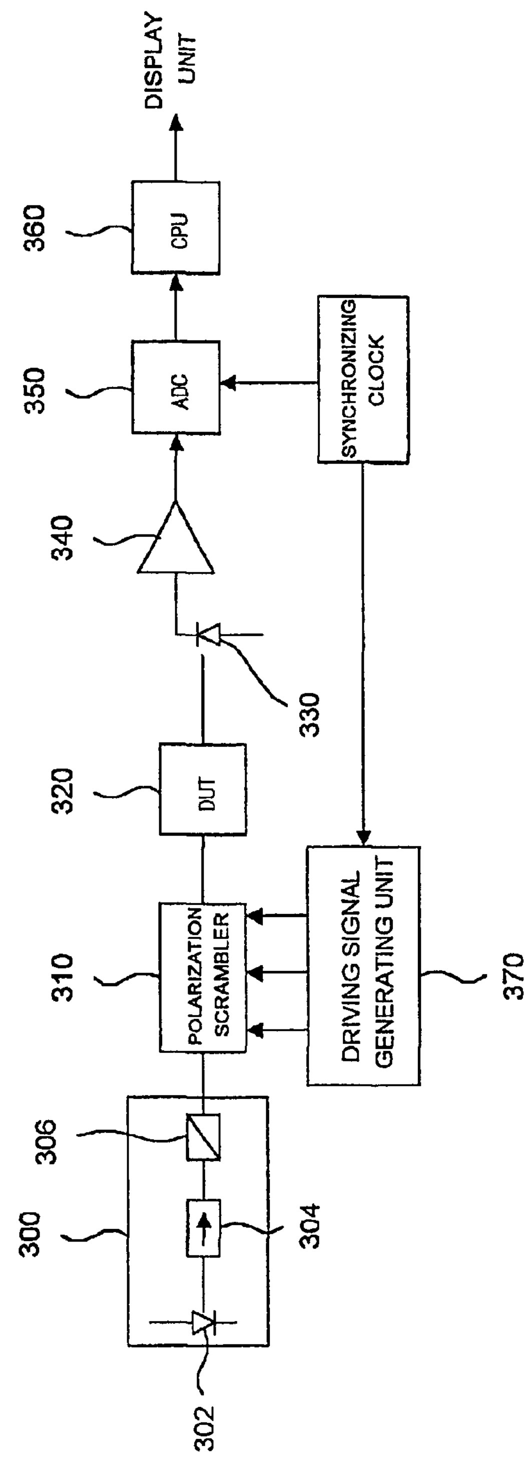
FIG. 2 shows the structure of an apparatus for measuring PDL according to an embodiment of the invention.

FIG. 2 shows the structure of an apparatus for measuring PDL according to an embodiment of the invention. An apparatus and method of the invention will be described in reference to the structure in FIG. 2. Referring to FIG. 2, an incident optical signal having a predetermined polarization state is obtained from incident light-providing means 300 comprising a light source 302 such as a tunable laser or a Distributed Feed Back (DFB) laser diode, an isolator 304 and a polarizer 306, and then inputted into a polarization scrambler 310. The polarization scrambler 310 used in the apparatus of this embodiment includes optical fiber birefringence modulators including three cylindrical piezoelectric elements and optical fibers respectively wound around the outer walls of the piezoelectric elements without intermission, in which an optical fiber connecting between two adjacent modulators is so twisted that birefringence axes have an angle of 48 deg. with respect to each other. The optical fibers may utilize a relatively cheap single mode optical fiber or alternatively a polarization-maintaining optical fiber.

In the meantime, the optical birefringence modulators each are driven by a driving signal generating unit 370 including AC voltage sources which are synchronized to a common clock with respect to each of the optical fiber birefringence modulators and apply an AC voltage having a frequency corresponding to the multiple of an integer relatively prime with respect to a predetermined frequency F to the each optical fiber birefringence modulator.

Namely, three frequencies $f_1$, $f_2$ and $f_3$ are determined according to Equation 2:

$$f_1 f_2 f_3 = F^*(k,l,m) \qquad \text{Equation 2,}$$

where k, l and m are integers which are relatively prime from one another.

The frequency F can be one value selected from a frequency group including 1 kHz, 2 kHz, 5 kHz and 10 kHz. In this embodiment, the three modulators are respectively modulated according to sinusoidal waveforms of $f_1$=770 kHz, $f_2$=950 kHz and $f_3$=1070 kHz. The modulation amplitude is preferably adjusted to satisfy a condition of 3.14 or more with respect to each of the three modulators, but adjusted $\Phi_{m1}$=4.36 rad, $\Phi_{m2}$=5 rad, $\Phi_{m3}$=5.8 rad in this embodiment. This value enables polarization variation which can completely cover a globe of Poincare. In other words, this generates all polarization states adequate for application of a method of scanning all polarization states in one period. After passing through the scrambler 310 as above, the optical signal enters the DUT 320. Since the polarization state variation of the incident optical signal into the DUT 320 is repeated at every interval of temporal period T (1/F), the intensity variation of the optical signal after passing through the DUT 320 is repeatedly reproduced with the period T. After passing through the DUT 320, the optical signal propagates along a photodetector 330 and a high-speed amplifier 340 in sequence, and then is modulated by an Analog-Digital Converter (ADC) 350 so as to be adequate to processing. In the meantime, the ADC 350 is synchronized with the clock which determines periods of modulation signals of the polarization modulators included in the polarization scrambler 310. In order to reduce noise by the photodetector 330, this embodiment employs an averaging method. The optical signal is averaged in a signal-processing unit 360 after converted as above in the ADC 350. This averaging process reduces noise accompanying to every measurement. Since modulation frequencies have the highest common factor of 10 kHz, the modulated optical signal has a period of 100 μs. In this case, the polarization modulators in the polarization scrambler 310 are synchronized with the ADC 350 as above so as to realize a real-time averager capable of averaging a waveform of 100 μs for 1000 times. Therefore, the measuring time is 0.1 sec. obtained from 100 $\mu$s multiplied by 1000 in this case. When the averaging process is completed as above, a measured value is displayed via a display unit.

Figure 3:
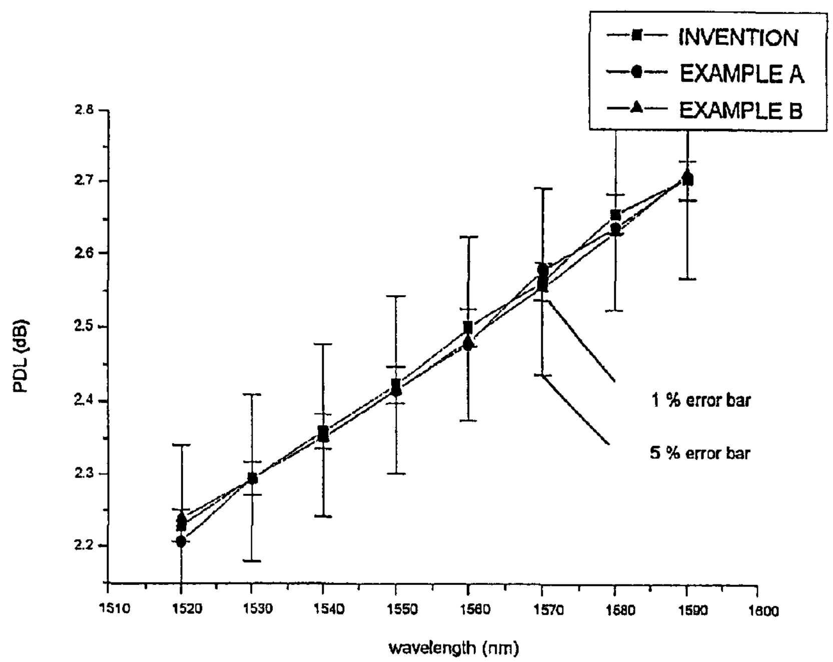
FIG. 3 is a graph illustrating PDL values of an optical device measured according to an apparatus and method of the invention, in which the optical device is known to have a PDL value of 2.42 dB at 1550 nm.

FIG. 3 is a graph illustrating PDL values of an optical device measured according to an apparatus and method of the invention, in which the optical device is known to have a PDL value of 2.42 dB at 1550 nm. For the sake of comparison, PDL values measured according to conventional measuring apparatuses and methods are shown together. In measurement of PDL, wavelength of incident light into the optical device is varied with an interval of 10 nm in the range from 1520 nm to 1590 nm. In the graph, circles designate measurements taken by a conventional apparatus (Example A) according to all state scanning method, and triangles designate measurements taken by another conventional apparatus (Example B) according to Mueller matrix method. Referring to FIG. 3, the above three methods provide very similar PDL values with errors of ±1% or less. Although three measuring methods provide the very similar PDL values for the same optical device as compared above, an overwhelming result is obtained according to the apparatus and method of the invention in regard with the measuring time. In measuring the PDL values at a wavelength, measuring times of 10 and 2 second are respectively consumed in the Examples A and B, whereas a measuring time of 0.1 second is consumed in the case according to the apparatus and method of the invention.

Figure 4:
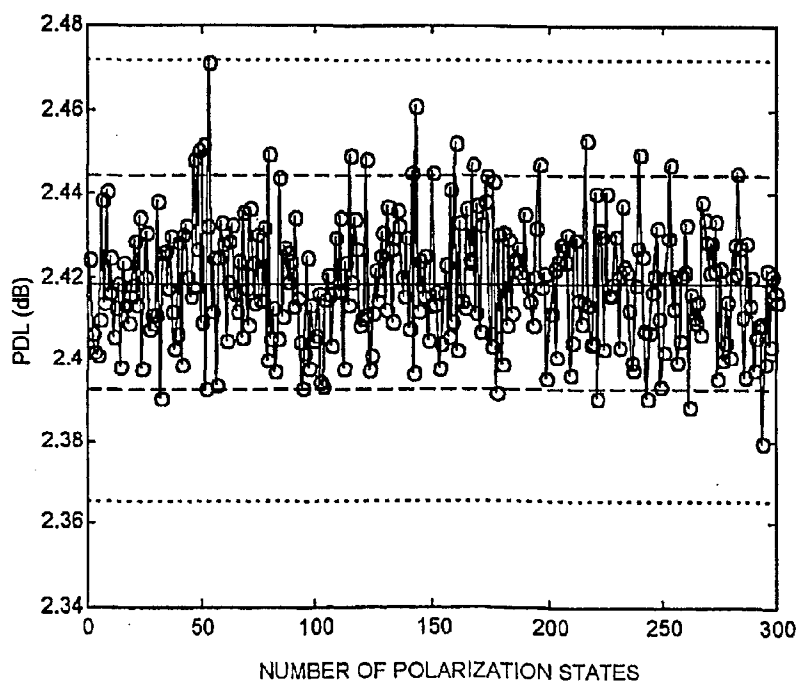
FIG. 4 is a graph illustrating the influence due to the variation of input polarization according to an apparatus and method of the invention.

FIG. 4 is a graph illustrating the influence due to the variation of input polarization according to an apparatus and method of the invention. In other words, FIG. 4 shows PDL values measured from an optical signal passing through the optical device by applying the optical signals having 300 polarization states different from one another to the polarization scrambler 310 shown in FIG. 2. Referring to FIG. 4, it can be seen that the deviation of the measured PDL values is ±1% or less across the entire polarization states. This result proves that any optical signal passing through the polarization scrambler undergoes all types of polarization states according to the apparatus and method of the invention.

Figure 1:
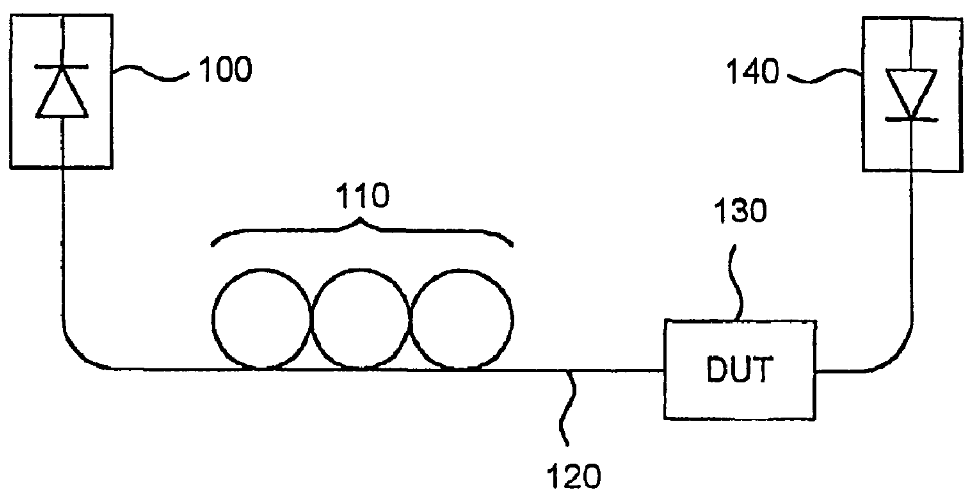
FIG. 1 shows the structure of an apparatus for measuring PDL according to all state scanning.

In the meantime, Table 1 shows the number of averaging and the variation of PDL values when the apparatus and method of the invention is used under the environment where noise is influential. A PDL value of the optical device is 0.717 dB when measured according to a conventional apparatus shown in FIG. 1.

TABLE 1

| Number of Averaging | Time (msec.) | PDL (db) |
|---|---|---|
| 1 | 0.1 | 1.422 |
| 10 | 1 | 0.888 |
| 100 | 10 | 0.804 |
| 1000 | 100 | 0.723 |

Referring to Table 1, the measurements can be correctly obtained in a short time period according to the apparatus and method of the invention even if noise is heavy.

According to the apparatus and method for measuring PDL of the invention as set forth above, the mean value is obtained through repetitive measurement of input polarization as well as periodic scrambling thereof so as to elevate measurement precision. Further, the invention adopts the polarization scrambler capable of performing a high-speed operation thereby to enhance measuring speed.

Industrial Applicability

Although the present invention has been described in reference to the above embodiment and the accompanying drawings, those skilled in the art will appreciate that various modifications, additions and substitutions can be made without departing from the scope and spirit of the invention as disclosed in the accompanying claims. Therefore, while it has been explained that the apparatus of the invention has the polarizer separated from the light source, the separate polarizer is not necessary if the light source outputs polarized light by itself.

What is claimed is:

1. An apparatus for measuring a polarization-dependent loss, the apparatus comprising:

(a) a light source;

(b) a polarizer for converting a light irradiated from said light source into a polarized light;

(c) a polarization scrambler for modulating polarization state of said polarized light with a frequency F, said polarization scrambler including:

(c-1) optical fiber birefringence modulators including at least three cylindrical piezoelectric elements and optical fibers respectively wound around the outer walls of said piezoelectric elements without intermission, and (c-2) AC voltage sources synchronized to a common clock with respect to each of said optical fiber birefringence modulators for applying an AC voltage having a frequency corresponding to the multiple of an integer relatively prime with respect to a predetermined frequency F to said each optical fiber birefringence modulator;

(d) a photodetector for, when the output light of the polarization scrambler passes through an object under test, detecting the optical power of the output light undergoes the object;

(e) an ADC synchronized to the common clock, for providing an intensity profile of the output light with the period of 1/F; and (f) a digital signal processing unit for averaging the periodic intensity profile of the output light from said ADC to restrain a noise accompanying to each measurement.

2. The apparatus as claimed in claim 1, wherein the optical fibers maintain a twisted state such that a birefringence axis between the adjacent birefringence modulators has an angle of 48 degree with respect to each other.

3. The apparatus as claimed in claim 1, wherein the frequency F is one selected from a group consisting of 1 kHz, 2 kHz, 5 kHz and 10 kHz.

4. The apparatus as claimed in claim 1, wherein the birefringence modulators have modulation amplitudes of 3.14 or more.

5. The apparatus as claimed in claim 1, wherein said optical fibers respectively wound around the outer walls of said piezoelectric elements are single mode optical fibers.

6. A method for measuring a polarization-dependent loss, the method comprising the steps of:

preparing a polarized incident light;

inputting the incident light into a polarization scrambler and outputting a polarization-scrambled output light with a predetermined frequency F, wherein the polarization scrambler comprises: optical fiber birefringence modulators including at least three cylindrical piezoelectric elements and optical fibers respectively wound around the outer walls of the piezoelectric elements without intermission, and AC voltage sources synchronized to a common clock with respect to each of the optical fiber birefringence modulators for applying an AC voltage having a frequency corresponding to the multiple of an integer relatively prime with respect to the predetermined frequency F to the each optical fiber birefringence modulator;

passing the light outputted from said polarization scrambler through an optical device under test;

detecting an output of the light that has passed through the optical device using a photodetector; and averaging detected values of the photodetector with respect to birefringence modulation having a constant period to calculate the polarization-dependent loss from a ratio of the maximum output and the minimum output with respect to the period.

* * * * *